(12) United States Patent
Han et al.

(10) Patent No.: US 10,009,448 B2
(45) Date of Patent: Jun. 26, 2018

(54) MOBILE TERMINAL

(71) Applicant: LG ELECTRONICS INC., Seoul (KR)

(72) Inventors: Dongsu Han, Seoul (KR); Hyunjin Kim, Seoul (KR); Jungwhan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/415,731

(22) Filed: Jan. 25, 2017

(65) Prior Publication Data

US 2017/0318136 A1    Nov. 2, 2017

Related U.S. Application Data

(60) Provisional application No. 62/328,625, filed on Apr. 28, 2016.

(30) Foreign Application Priority Data

Jul. 4, 2016    (KR) .................... 10-2016-0084285

(51) Int. Cl.
*H04M 1/00* (2006.01)
*H04M 1/02* (2006.01)

(52) U.S. Cl.
CPC ........ *H04M 1/026* (2013.01); *H04M 2250/12* (2013.01)

(58) Field of Classification Search
CPC ...... H04B 1/03; H04M 1/026; H04M 2250/12

USPC ........................................... 455/550.1, 575.1
See application file for complete search history.

(56) References Cited

U.S. PATENT DOCUMENTS

2015/0219608 A1* 8/2015 Choi .................. G01N 33/0004
73/23.2
2017/0257480 A1* 9/2017 Tanabe .............. H04M 1/72569

FOREIGN PATENT DOCUMENTS

DE    10159436    6/2003
EP    2620768    7/2013

OTHER PUBLICATIONS

European Patent Office Application Serial No. 17000500.3, Search Report dated Jul. 28, 2017, 7 pages.

* cited by examiner

*Primary Examiner* — Ping Hsieh
(74) *Attorney, Agent, or Firm* — Lee Hong Degerman Kang & Waimey

(57) ABSTRACT

A mobile terminal a gas sensor module disposed close to the case, and configured to sense includes: a terminal body provided with a case having one or more holes; and specific gas as air is introduced into the terminal body through the hole, wherein the gas sensor module includes: a gas sensor configured to sense the specific gas; and an accommodation cap having an accommodation unit where the gas sensor is disposed, having a gas hole communicated with the hole, and having its inner surface facing the gas hole formed as an inclined surface such that the introduced air reaches the gas sensor.

18 Claims, 14 Drawing Sheets

(a)                  (b)

MOBILE TERMINAL

CROSS-REFERENCE TO RELATED APPLICATION

Pursuant to 35 U.S.C. § 119(a), this application claims the benefit of earlier filing date of and right of priority to Korean Application No. 10-2016-0084285, filed on Jul. 4, 2016, and also claims the benefit of U.S. Provisional Application No. 62/328,625, filed on Apr. 28, 2016, the contents of which are all hereby incorporated by reference herein in their entirety.

BACKGROUND OF THE INVENTION

1. Field of the Invention

This specification relates to a mobile terminal having a gas sensor.

2. Background of the Invention

A mobile terminal includes all types of devices provided with a battery and a display unit and carried by a user, the devices configured to output information to the display unit using power supplied from the battery. The mobile terminal includes a device for recording and playing moving images, a device for displaying a graphic user interface (GUI), etc., which includes a notebook, a mobile phone, glasses, a watch, a game console, etc.

Such mobile terminal has become increasingly more functional. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players.

Efforts are ongoing to support and increase the functionality of mobile terminals. Such efforts include software and hardware improvements, as well as changes and improvements in the structural components.

As functions of the mobile terminal become diversified recently, being developed are various techniques to care a user's health by providing information on an environmental state to the user. Especially, as air pollution increases and a larger amount of chemical materials are used, needs to check a current air state immediately are increased. However, it is difficult to mount a gas sensor to an inner space of the mobile terminal where a large number of electronic components have been mounted. Especially, in case of utilizing a semiconductor type sensor driven by heat emission, heat emission from the mobile terminal is caused.

SUMMARY OF THE INVENTION

Therefore, an aspect of the detailed description is to provide a mobile terminal having a gas sensor module for sensing gas.

To achieve these and other advantages and in accordance with the purpose of this specification, as embodied and broadly described herein, there is provided a mobile terminal, including: a terminal body provided with a case having one or more holes; and a gas sensor module disposed close to the case, and configured to sense specific gas as air is introduced into the terminal body through the hole, wherein the gas sensor module includes: a gas sensor configured to sense the specific gas; and an accommodation cap having an accommodation unit where the gas sensor is disposed, having a gas hole communicated with the hole, and having its inner surface facing the gas hole formed as an inclined surface such that the introduced air reaches the gas sensor.

In an embodiment of the present invention, the gas sensor may be mounted to a lower part of the accommodation unit, and the gas sensor may further include an inlet formed to introduce gas introduced into the terminal body through the gas hole, to the gas sensor. The inclined surface may not be overlapped with the inlet, and a width of the accommodation unit may become wider toward the lower part by the inclined surface. With such a configuration, air including gas may be efficiently introduced into or discharged from the accommodation cap.

In an embodiment of the present invention, the gas sensor module may be formed to be detachable from an accommodation region to accommodate the gas sensor module therein, and the gas sensor module having a gas sensor for sensing another type of gas may be mountable to the accommodation region. The gas sensor module may include a plurality of gas sensors disposed in the accommodation cap.

In an embodiment of the present invention, the mobile terminal may include a plurality of electronic components mounted to the terminal body, and a plurality of holes corresponding to the plurality of electronic components. The accommodation unit of the accommodation cap may be formed to be communicated with at least one of the plurality of holes. With such a configuration, a gas introducing structure may be implemented without an additional hole formed at the terminal body.

The present invention may have the following advantages.

Firstly, since the gas sensor module is formed to be replaceable in the mobile terminal, a user may selectively replace the gas sensor module by another gas sensor module including a specific gas sensor for detecting a desired gas type.

Further, the accommodation cap where the gas sensor is accommodated includes the gas hole, and one of inner surfaces which form the accommodation unit where the gas sensor is accommodated is formed as an inclined surface. This may allow gas introduced into the gas hole, to efficiently reach the gas sensor, and may allow the introduced gas to be easily discharged to the outside of the mobile terminal. As introduction and discharge of gas is facilitated, a gas sensing efficiency may be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
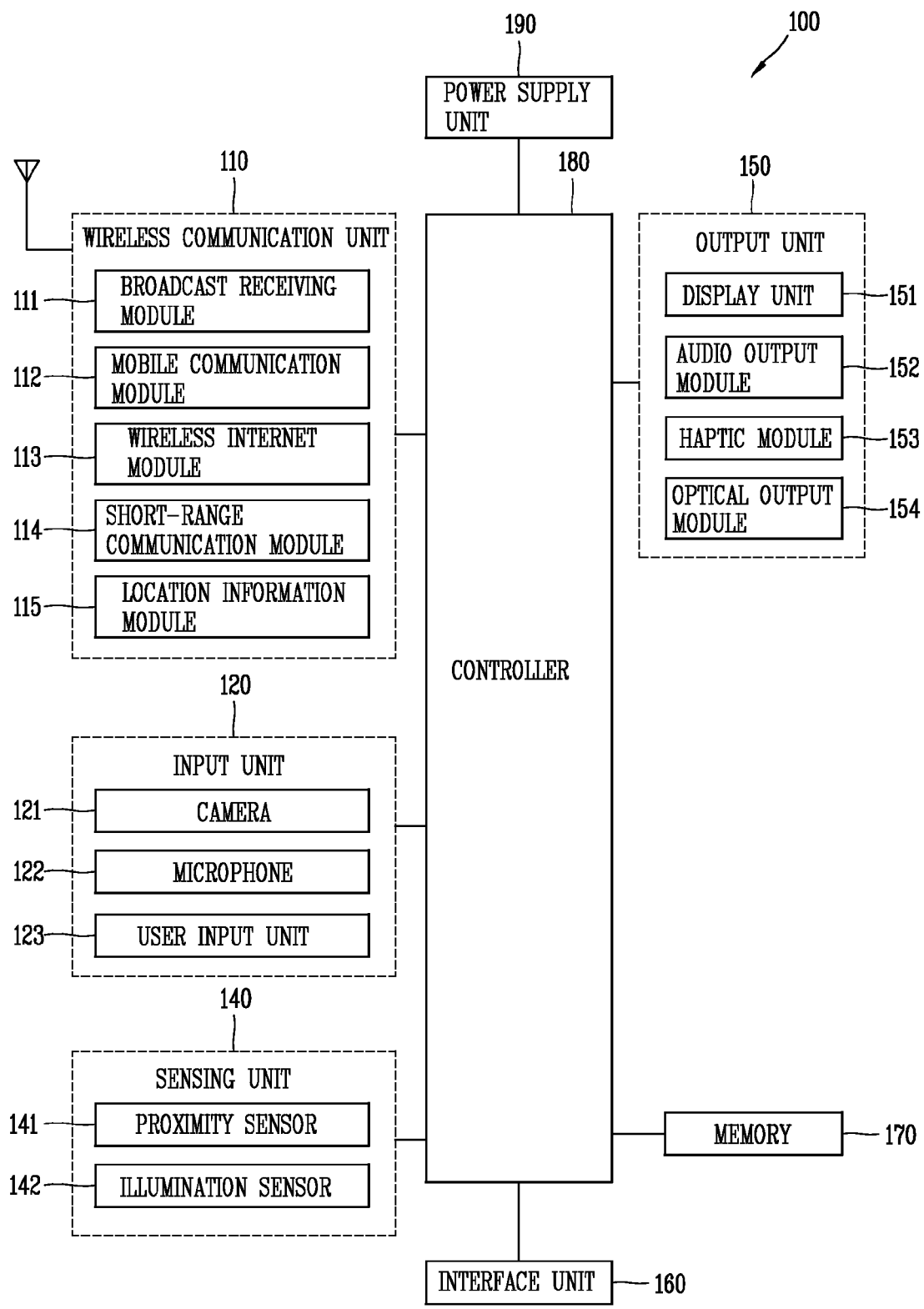
FIGS. 1A to 1C are block diagrams of a mobile terminal according to the present invention.
Figure 1B:
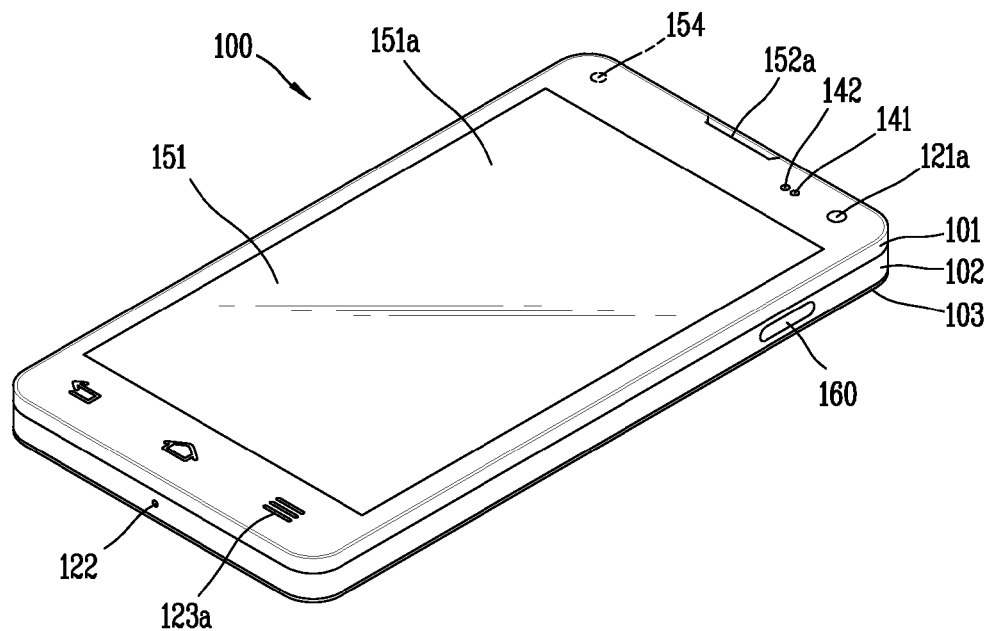
Figure 1C:
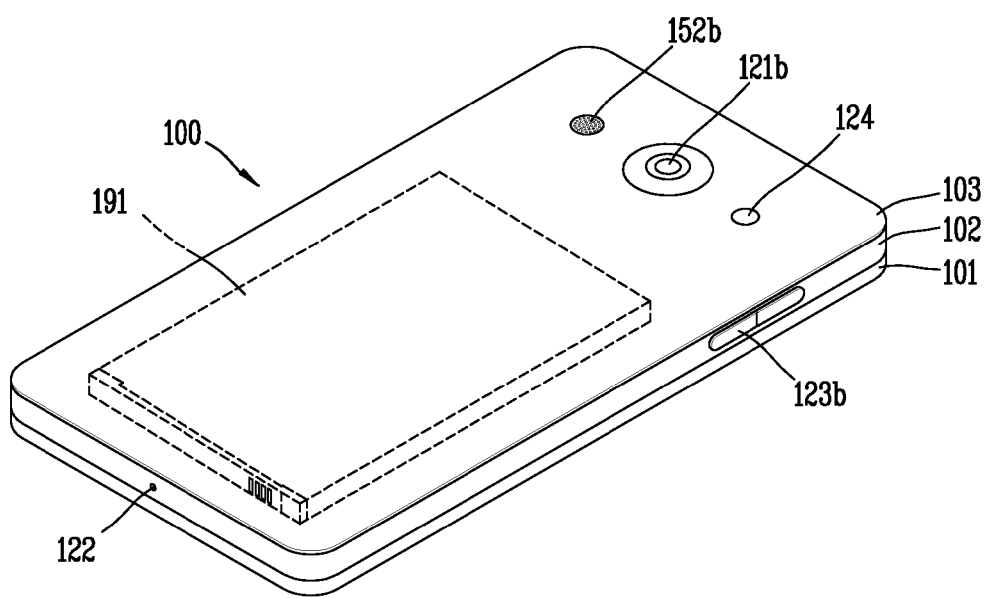

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force. In the present invention, a plurality of 3-axis magnetic sensors 143a, 143b are provided at the mobile terminal 100 to more precisely sense a position and a direction of an object which generates a magnetic field.

For this, the plurality of 3-axis magnetic sensors 143a, 143b may be independent from each other, and may be spaced from each other in different directions. The controller 180 may execute a differentiated operation based on a size of a magnetic field measured by the plurality of 3-axis magnetic sensors 143a, 143b. More specifically, the controller 180 may detect a position, a direction, an angle, etc. of an object which generates a magnetic field, based on a size of a magnetic field measured by the plurality of 3-axis magnetic sensors 143a, 143b.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller.

The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint.

The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
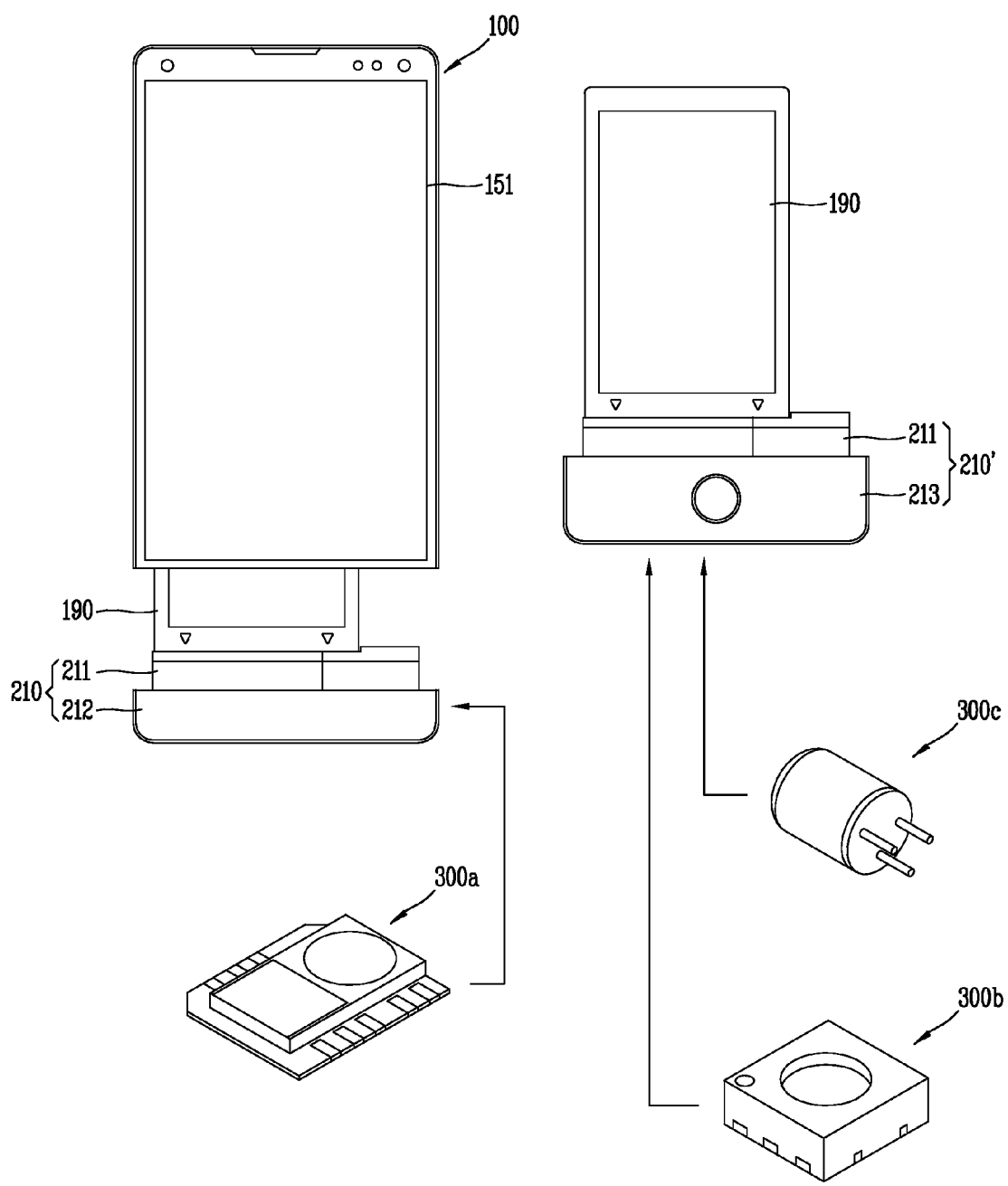
FIG. 1D is a conceptual view for explaining a mobile terminal having a gas sensor module according to another embodiment of the present invention.

FIG. 1D is a conceptual view for explaining the mobile terminal having a gas sensor module according to another embodiment of the present invention.

Referring to FIG. 1D, the mobile terminal 100 includes a terminal body, and a sub body 210 mounted to one end of the terminal body in a detachable manner. Various electronic components including the display unit 151 are disposed at the terminal body. The terminal body has an inner space where the power supply unit 190 for supplying power is arranged.

The power supply unit 190 is fixed to the sub body 210 in a detachable manner. The sub body 210 is fixed to the terminal body so as to cover the inner space. The sub body 210 includes a second body 212 which forms appearance when the sub body 210 is coupled to the terminal body; and a first body 211 protruded from the second body 212, disposed at the inner space of the terminal body, and to which the power supply unit 190 is fixed.

A first sensor module 300a may be mounted to the sub body 210. The first sensor module 300a may be implemented as a sensor for measuring a concentration of harmful gas which may influence on a human body. For instance, the first sensor module 300a may be a sensor for measuring a concentration of a volatile organic compound (TVOC) in the air and/or a concentration of carbon dioxide ($CO_2$). The sub body 210 may be provided with an inner space where the first sensor module 300a formed as a single module is mountable.

The mobile terminal 100 includes the terminal body and the sub body 210. And the sub body 210 includes a functional body 213 having electronic components for executing specific functions, and the first body 211 protruding from the functional body 213, and to which the power supply unit 190 is fixed. The functional body 213 and the second body 212 may be formed to be different from each other in shape and size.

The functional body 213 may be also provided with an inner space where a second sensor module 300b for sensing a concentration of a volatile organic compound (TVOC) in the air and/or a third sensor module 300c for sensing a concentration of alcohol are mounted.

The first to third sensor modules 300a, 300b, 300c may be formed to be integral with or to be separated from the second body 212 and the functional body 213. In a case where the first to third sensor modules 300a, 300b, 300c are integrally formed with the second body 212 and the functional body 213, the sub body 210 may be separated from the terminal body, and then a sub body 210' having therein a sensor module for sensing a desired type of gas may be mounted to the terminal body.

On the other hand, if the first to third sensor modules 300a, 300b, 300c are formed to be separated from the second body 212 and the functional body 213, a user may mount a sensor module for sensing a desired type of gas. A different type of sensor module for sensing a different type of gas may be fixed to the functional body 213.

The different type of sensor module for sensing a different type of gas may be provided with sensors different from each other in shape.

Unlike in the drawings, the gas sensor module may be disposed at the inner space of the terminal body. For instance, the sensor module may be attached to the inner space of the terminal body 100, the inner space exposed to the outside after the power supply unit 190 is separated from the terminal body.

In this embodiment, the gas sensor module for sensing a different type of gas may be replaced, by using the detachable sub body formed to expose the inner space of the terminal body. This may allow a user to acquire desired information by additionally purchasing a required sensor module.

FIGS. 2A to 2D are conceptual views for explaining an inner structure of the mobile terminal having a sensor module disposed at one region of the mobile terminal shown in FIG. 1B.

Figure 2A:
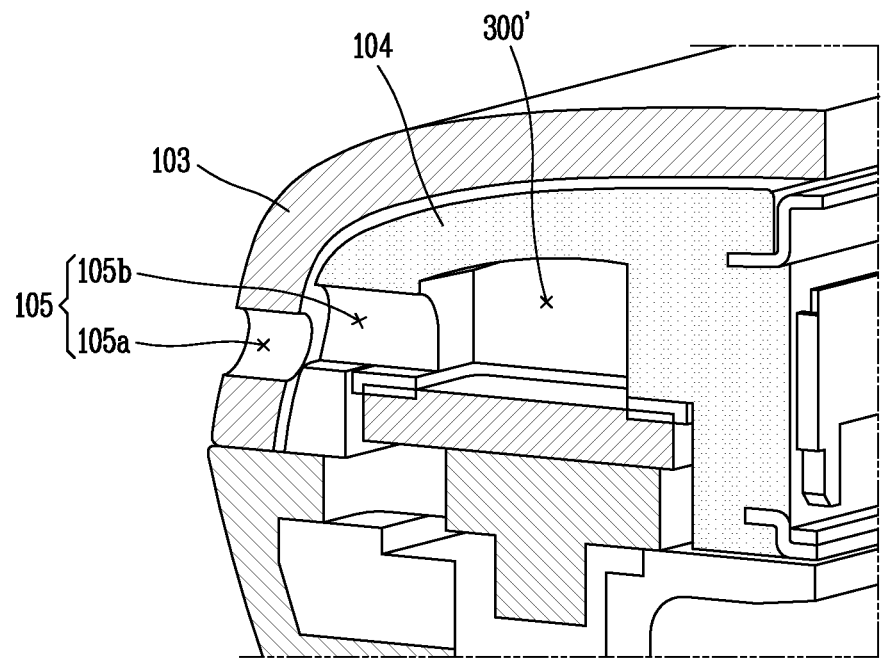
FIGS. 2A to 2D are conceptual views for explaining an inner structure of a mobile terminal having a sensor module disposed at one region of the mobile terminal shown in FIG. 1B.

FIG. 2A is a conceptual view for explaining an inner structure of the mobile terminal where a sensor module is arranged at a region adjacent to the rear cover 103. The mobile terminal 100 includes an accommodation region 300' to mount the gas sensor module in the rear cover 103 and an inner frame 104 coupled to the rear cover 103.

The rear cover 103 which forms appearance of the mobile terminal 100 may be formed to be separable from the inner frame 104. The rear cover 103 and the inner frame 104 include an air hole 105 having first and second holes 105a, 105b connected to the accommodation region 300'. External air may reach the accommodation region 300' through the first hole 105a of the rear cover 103 and the second hole 105b, sequentially.

Figure 2B:
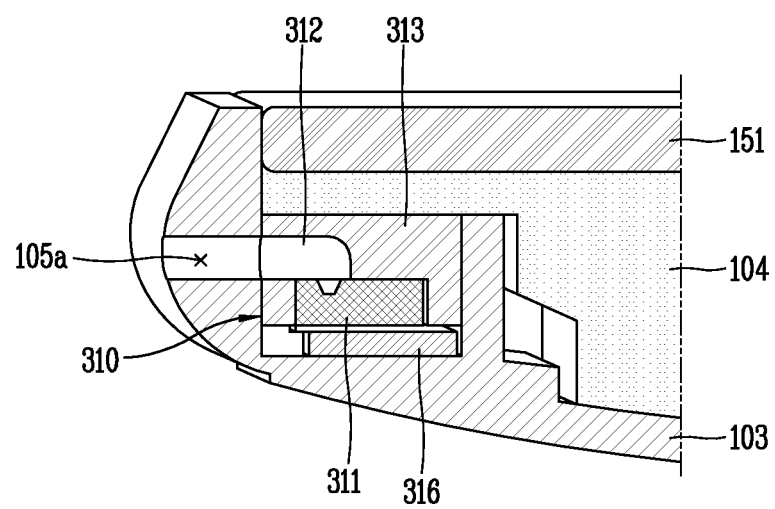

FIG. 2B illustrates a gas sensor module 300 mounted to the accommodation region formed by the rear cover 103 and the inner frame 104.

Once the rear cover 103 and the inner frame 104 are separated from each other, the gas sensor module 300 may be exposed to the outside, and the gas sensor module 300 may be replaceable by another gas sensor module including another type of gas sensor.

The gas sensor module 300 includes a gas sensor 311, an accommodation cap 313 configured to accommodate the gas sensor 311 therein, a conductive member 316, and a flexible printed circuit board 181a. The gas sensor 311 is accommodated at an inner space of the accommodation cap 313, and the accommodation cap 313 includes a gas hole 312 communicated with the first hole 105a of the rear cover 103.

The accommodation cap 313 may be formed to have the same shape as the accommodation region formed by the rear cover 103 and the inner frame 104. The accommodation cap 313 may be formed of a rubber material elastically transformable so as to prevent damage of the gas sensor 311, and so as to be replaceable in the mobile terminal 100.

The gas sensor module may disperse heat emitted from the mobile terminal 100, since it may acquire a maximum distance from other electronic components in an arranged state near the rear cover 103. Although not shown, the gas sensor module is preferably disposed at a region close to a lower end or a side surface which is less influenced by a temperature and a humidity of the mobile terminal 100, and which is less influenced by heat emitted from the inside of the mobile terminal.

Figure 2C:
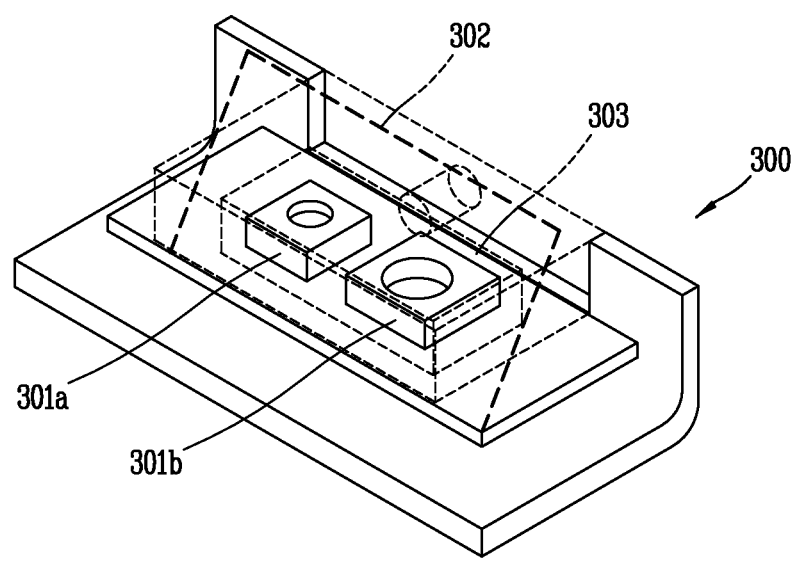

FIG. 2C is a conceptual view illustrating the gas sensor module including a plurality of gas sensors. The gas sensor module 300 includes an accommodation cap 303, a gas hole 302 formed at the accommodation cap 303, and first and second gas sensors 301a, 301b mounted in the accommodation cap 303.

The first and second gas sensors 301a, 301b may be formed to detect the same type of gas. Power may be applied to the first gas sensor 301a to detect gas. Then, if the lifespan of the first gas sensor 301a is terminated, power may be applied to the second gas sensor 301b.

The first and second gas sensors 301a, 301b may be formed to detect different types of gas, and may be formed to be different from each other in size and shape. The gas sensors of the present invention may have any types. For instance, the gas sensors may be configured to detect a carcinogen such as benzene, toluene and formaldehyde which cause a sick house syndrome, to detect harmful gas such as ammonia or methane in order to check spoilage of food, or to detect indoor harmful gas by sensing poisonous gas inside a public place. Alternatively, the gas sensors may be configured to measure an indoor or outdoor air cleanliness by sensing carbon monoxide (CO), carbon dioxide ($CO_2$), ozone, nitrogen dioxide ($NO_2$), etc., or may be configured to sense a temperature and a humidity. Alternatively, the gas sensors may be configured to sense gas emitted from a human's body. For instance, the gas sensors may be configured to check diseases by sensing bad breath and infections inside the body, or may be configured to measure a driver's blood alcohol level. Alternatively, the gas sensors may be configured to discern wine, or may be configured to detect a specific type of gas in order to measure sugar contents of fruits and to sense agricultural pesticides.

The gas sensor included in the mobile terminal 100 according to the present invention may be formed as a semiconductor gas sensor. The semiconductor gas sensor applies a voltage in order to heat a heater, and detects gas by using a change of an electrical resistance occurring when the gas contacts the surface of the semiconductor gas sensor formed of a ceramic semiconductor material.

The semiconductor gas sensor may be configured to detect various types of gas such as combustible gas and toxic gas, and may sensitively react even with vapor. Further, the semiconductor gas sensor may be controlled to sense a desired type of gas by combining a catalyst therewith, or by controlling an operation temperature thereof. The semiconductor gas sensor includes a metallic oxide film and an electrode formed on a base substrate.

Although not shown, the first and second gas sensors 301a, 301b may be fixed to the accommodation cap 303 in a detachable manner. Thus, a user may separate the first and second gas sensors 301a, 301b from the accommodation cap 303, and then may replace the first and second gas sensors 301a, 301b by another gas sensor for sensing another type of gas. This may allow the user to selectively mount a gas sensor for sensing a desired type of gas, to the mobile terminal 100.

Figure 2D:
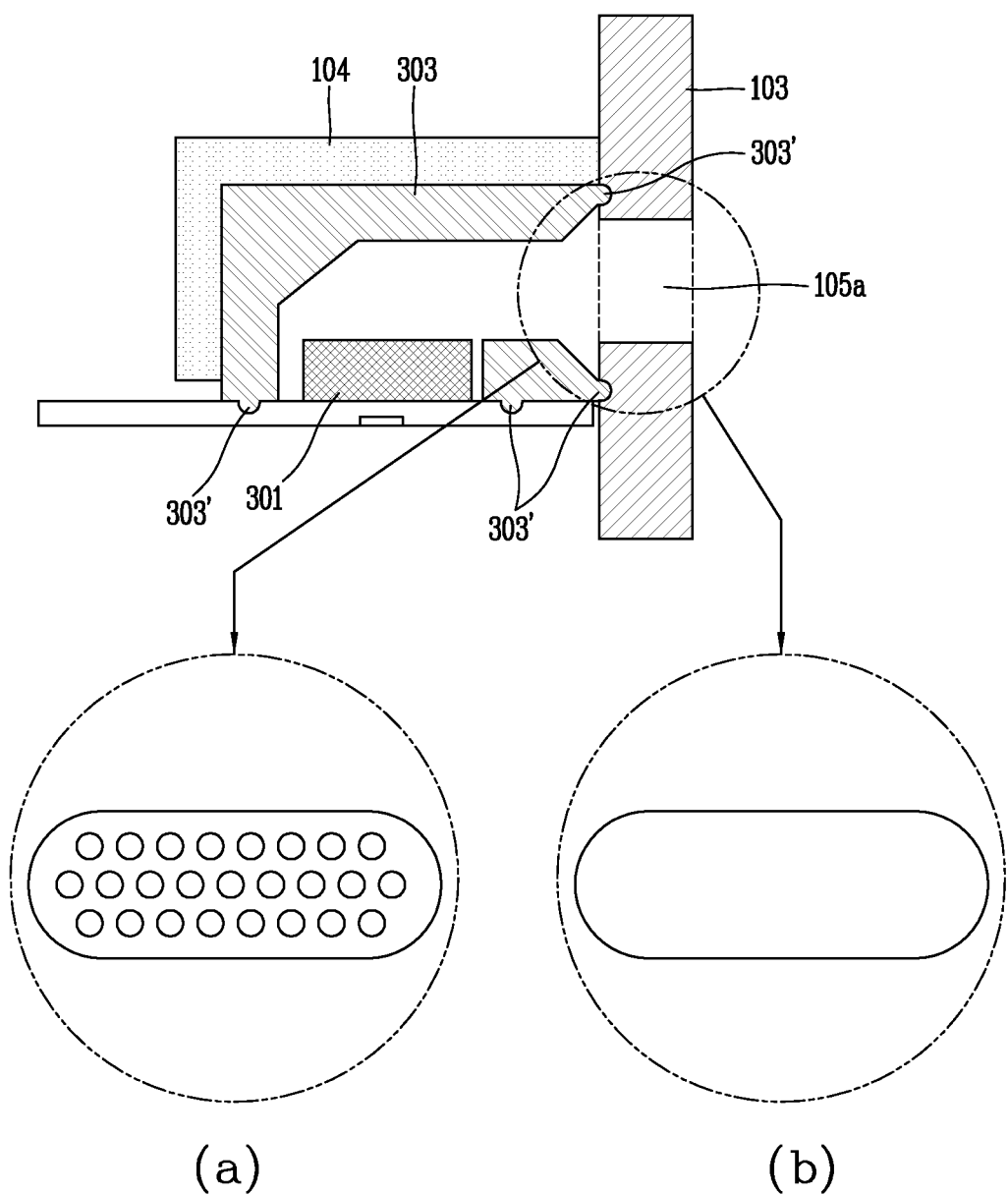

Referring to FIG. 2D, a structure of the gas sensor module will be explained in more detail.

FIG. 2D is a sectional view of the gas sensor module, which has been cut-out in one direction.

The gas sensor 301 is mounted to the inner space of the accommodation cap 303. The accommodation cap 303 is mounted to an accommodation region formed by the inner frame 104 and/or the rear cover 103. The accommodation cap 303 includes one or more shielding protrusions 303' protruded from an external surface of the accommodation cap 303. The shielding protrusions 303' are formed to be fitted into grooves of the rear cover 103, or are formed to be fitted into grooves of another component inside the rear cover 103. The shielding protrusions 303' prevent gas introduced into the accommodation cap 303 from leaking to another region of the mobile terminal 100.

The rear cover 103 includes a hole formed to introduce air into the accommodation cap 303. Referring to FIG. 2D(a), the hole may include a plurality of micro holes formed by a micro hole punching method for a size of a water molecule. This may prevent introduction of contaminants rather than gas into the gas sensor. Alternatively, the hole may be implemented as a single hole as shown in FIG. 2D(b).

The hole of the rear cover 103, communicated with the accommodation cap 303, may be implemented by using another hole for another electronic component.

FIGS. 3A to 3E are conceptual views for explaining a structure of the gas sensor module according to another embodiment of the present invention.

The gas sensor module 300 includes the accommodation cap 303 including an accommodation unit 302' where the gas sensor 301 is arranged. An inner surface of the accommodation cap 303 which forms the accommodation unit 302' includes first and second inclined surfaces 302a, 302b, and the accommodation cap 303 includes a hole connected to an external space of the mobile terminal 100 and configured to introduce gas into the accommodation cap 303 or to discharge gas to the outside.

The first and second inclined surfaces 302a, 302b are formed to have a specific angle therebetween on the basis of the gas hole 302. More specifically, the first and second inclined surfaces 302a, 302b are formed such that an angle therebetween is gradually increased on the basis of the gas hole 302. And the gas sensor 301 is arranged below the gas hole 302. Although not shown, an inlet through which gas inside the gas sensor 301 is introduced, is disposed above the gas sensor 301 so as to be close to the gas hole 302.

Figure 3A:
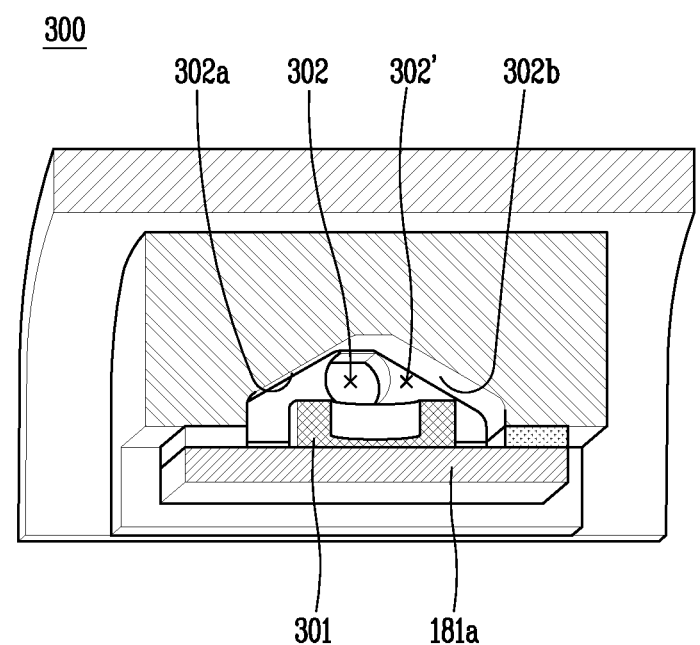
FIGS. 3A to 3E are conceptual views for explaining a structure of a gas sensor module according to another embodiment of the present invention.
Figure 3B:
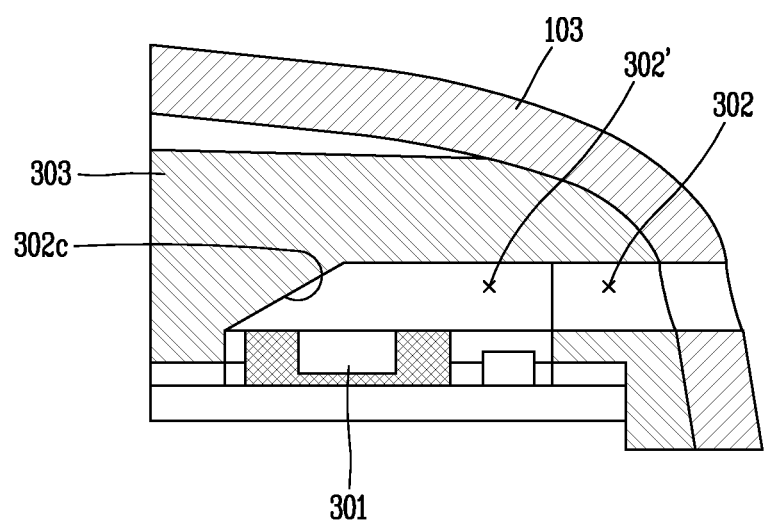
Figure 3C:
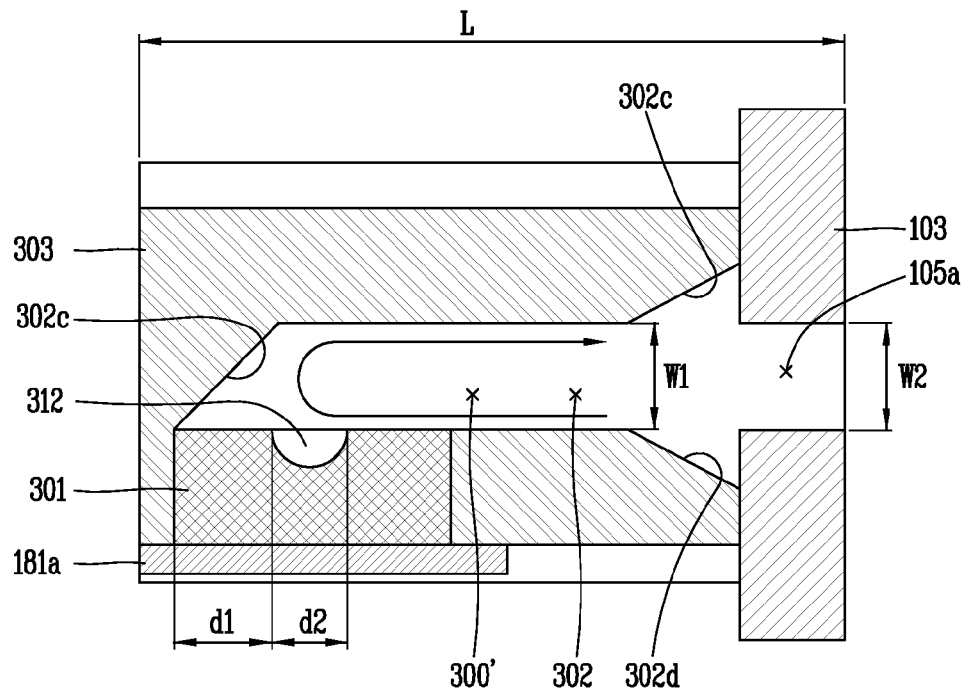

Referring to FIG. 3B, among inner surfaces of the accommodation cap 303, one surface facing the hole 302 is formed as a third inclined surface 302c. A distance between the third inclined surface 302c and the hole 302 becomes longer towards a lower part from an upper part of the accommodation unit 302'. That is, the accommodation unit 302' formed by the accommodation cap 303 is formed to become wider toward its lower region (a region where the gas sensor 301 is mounted) than its upper region.

Figure 3D:
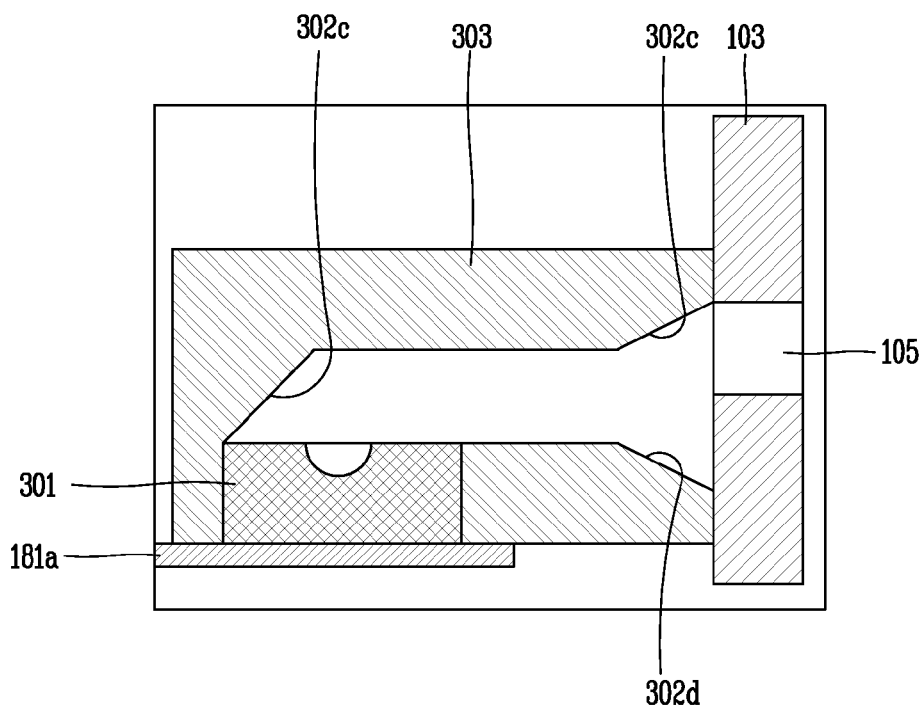

Referring to FIG. 3D, structures of the accommodation unit 302' formed by the accommodation cap 303 and the gas hole 302 will be explained in more detail.

The first gas sensor 310 includes an inlet 312 through which gas introduced into the accommodation unit 302' from the outside is introduced. The inlet 312 is formed to have a diameter of a second length (d1). The third inclined surface 302c is formed to face the gas hole 302 of the accommodation unit 302'. One end of the third inclined surface 302c is adjacent to the first gas sensor 310, and another end thereof becomes gradually distant from the first gas sensor 310. Another end of the third inclined surface 302c is not overlapped with the inlet 312 of the first gas sensor 310. That is, a distance between one end and another end of the third inclined surface 302c is a first distance (d1) by which said another end is not overlapped with the inlet 312.

With such a configuration, gas introduced into the mobile terminal through the gas hole 302 is reflected by the third inclined surface 302c to thus be introduced into the inlet 312. Accordingly, gas introduced into the gas hole 302 of the accommodation cap 303 does not stay at one region of the accommodation unit 302'. Rather, most of the gas is introduced into the inlet 312 to maximize a gas sensing efficiency.

The accommodation unit 302' is formed to have a first width (w1), and the first hole 105a of the rear cover 103 is formed to have a second width (w2). The first and second widths (w1, w2) are preferably formed to be the same. However, the width (w1) of the accommodation unit 302' becomes great towards the first hole 105a.

Referring to FIG. 3D, even when an assembly error between the rear cover 103 and the gas sensor module 300 occurs, the gas hole 302 and the air hole 105 are communicated with each other. This may allow gas to stably pass through the gas hole 302 and the air hole 105 even in a case where the gas sensor module 300 is replaced by a user.

The first hole 105a and the gas hole 102 are disposed to be overlapped with each other. However, even if the first width (w1) and the second width (w2) are not completely overlapped with each other due to a design error, the width (w1) of the accommodation unit 302' becomes great gradually. This may prevent a problem that the gas hole 302 and the first hole 105a are not overlapped with each other.

The accommodation unit 302' is formed to have a specific length (L) or less than. For instance, the specific length may be about 7 mm. As the accommodation unit 302' is formed to have the specific length (L) or less than, a phenomenon that air stays in the mobile terminal may be minimized.

Figure 3E:
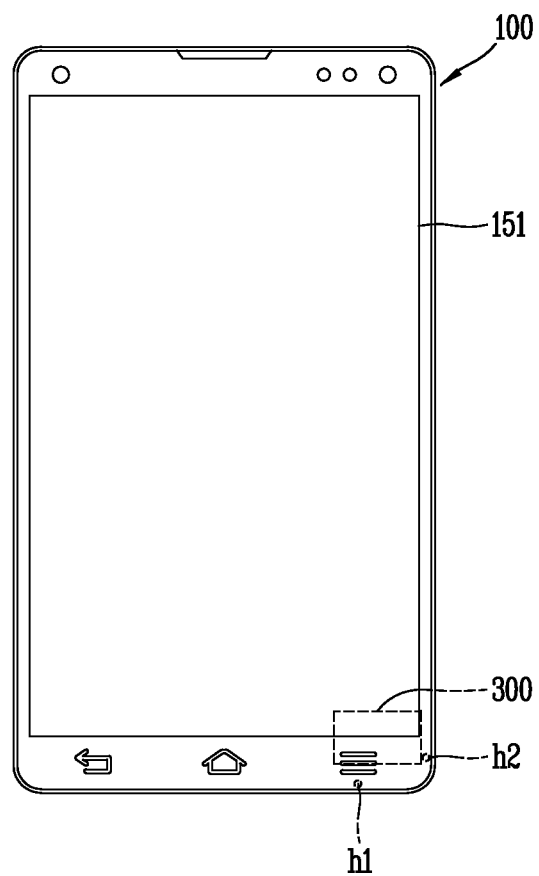

Referring to FIG. 3E, will be explained a structure where the gas sensor is communicated with a plurality of holes of the mobile terminal 100. According to an embodiment of the present invention, the accommodation cap 303 to accommodate the gas sensor 301 may include a plurality of gas holes. The plurality of gas holes are disposed to correspond to a plurality of holes for passing external air therethrough.

Referring to FIG. 3D, the mobile terminal may include a first hole (H1) formed on one lower side surface thereof, and a second hole (H2) formed at the rear cover. Air (gas) introduced into the gas sensor module 300 through the first hole (H1) may be discharged to the outside through the second hole (H2).

With such a configuration, a state of air continuously introduced into the mobile terminal 100 without staying in the mobile terminal 100 may be sensed.

Figure 4A:
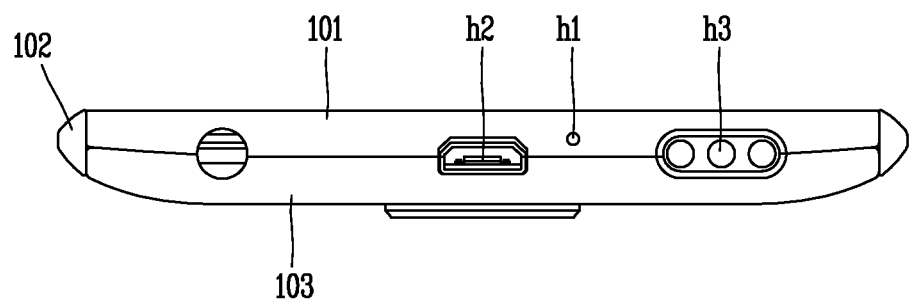
FIGS. 4A and 4B are conceptual views for explaining an arrangement structure of a gas sensor module, using openings for electronic components.
Figure 4B:
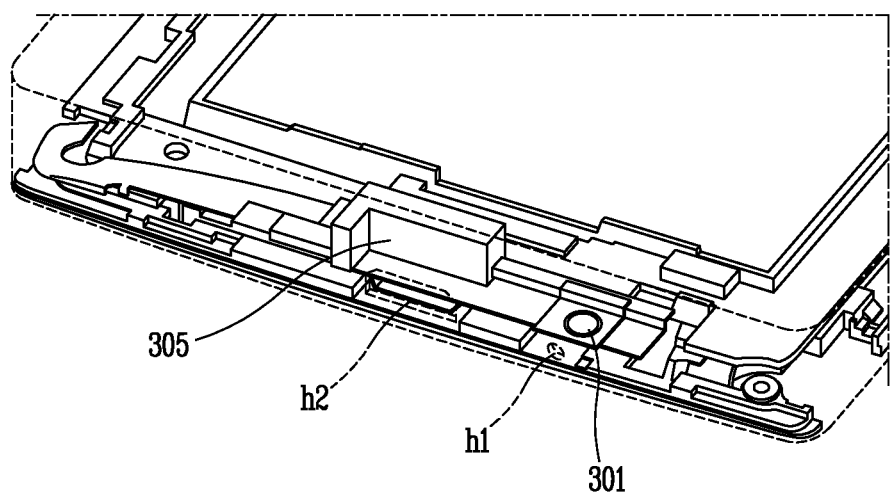

FIGS. 4A and 4B are conceptual views for explaining an arrangement structure of the gas sensor module, using openings for electronic components.

Referring to FIG. 4A, the mobile terminal includes a plurality of openings penetratingly-formed at the mobile terminal and configured to execute specific functions and to drive specific electronic components. For instance, a lower side surface of the mobile terminal, formed by the front case 101 and the rear cover 103, may include a first opening (h1) configure to insert a USB port, etc. to the interface unit 160, a second opening (h2) overlapped with the microphone 122 and configured to receive a voice signal, and a third opening (h3) overlapped with the speaker and configured to output audio data.

Referring to FIG. 4B, at least one of the first to third openings (h1, h2, h3) is used as a hole through which gas is introduced into the gas sensor module.

For instance, the gas sensor module 300 is disposed near the second opening (h2) corresponding to the microphone 122. The first opening (h1) is connected to the gas hole of the gas sensor module 300. The gas sensor module 300 may further include a guide unit 305 configured to guide a flow of gas (air). The guide unit 305 is configured to guide a movement of gas (air) such that the gas (air) introduced into the gas sensor is discharged from the gas sensor, and then is discharged to the outside of the mobile terminal through another opening. The guide unit 305 may extend to the second opening (h2) from the gas sensor.

The guide unit 305 may prevent the gas introduced into the gas sensor from being discharged to the inside of the mobile terminal 100. Further, as an additional electronic component is fixed to the guide unit 305, an inner space of the mobile terminal may be obtained.

In this embodiment, gas may be introduced into the mobile terminal through a hole formed to drive another electronic component. Accordingly, an additional hole through which gas is introduced may not be formed at the gas sensor module 300 disposed in the mobile terminal 100. This may allow the mobile terminal to have a simple appearance.

Further, since the gas sensor module is disposed near the plurality of openings, a movement (fluidity) of gas may be enhanced.

Figure 5:
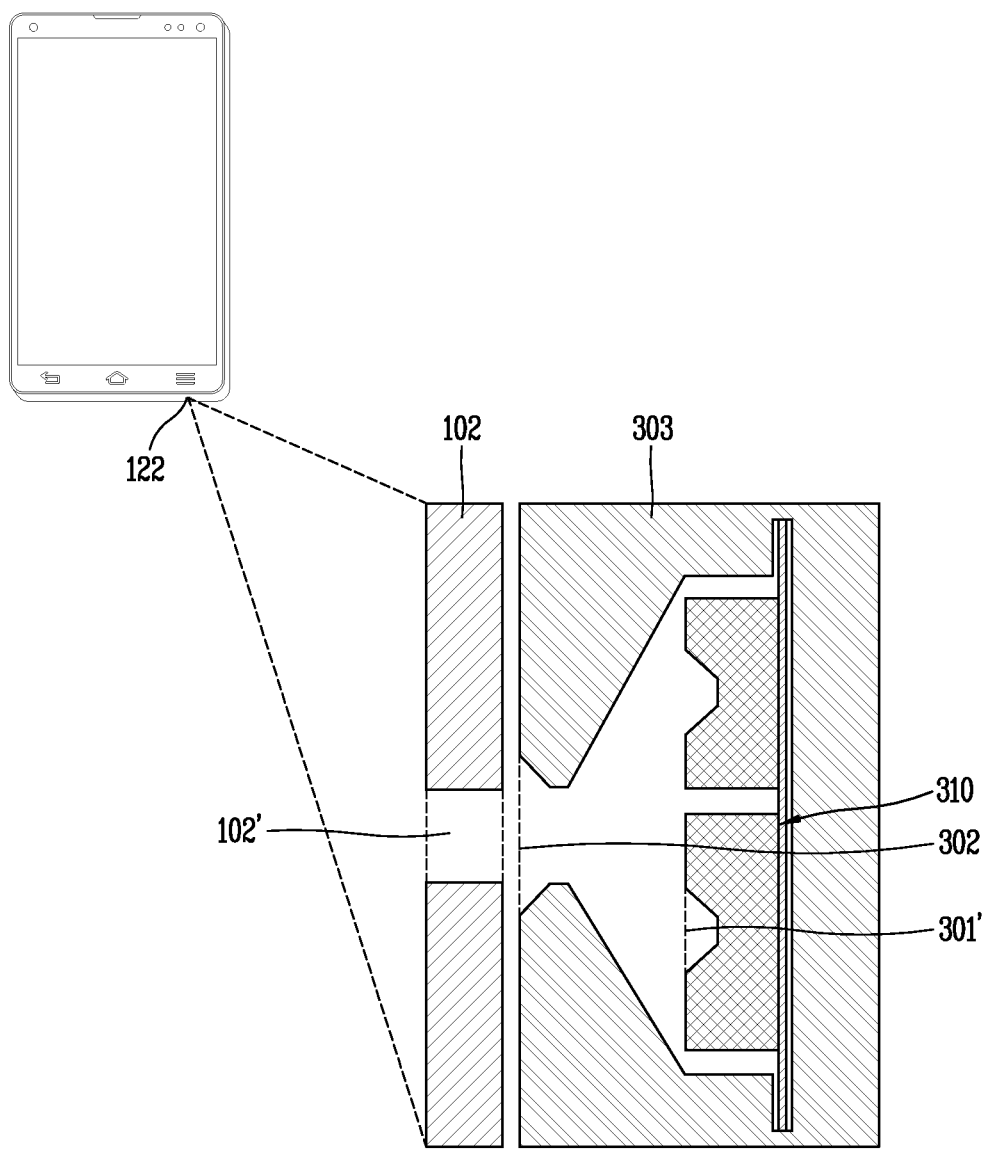
FIG. 5 is a conceptual view for explaining an arrangement structure of a moisture preventing unit formed for a gas sensor module according to the present invention.

FIG. 5 is a conceptual view for explaining an arrangement structure of a moisture preventing unit formed for the gas sensor module according to the present invention.

The gas sensor module 300 includes an inlet 301' of the gas sensor 301, and the gas hole 302 of the accommodation cap 303 configured to accommodate the gas sensor 301 therein. And the rear case 102 includes a hole 102' communicated with the gas hole 302 and configured to introduce gas into the gas sensor module 300 therethrough. A moisture preventing unit, configured to prevent moisture from being introduced into the gas sensor module, may be formed at one or more of the inlet 301', the gas hole 302 and the hole 102'.

In case of executing a micro hole punching process at the mobile terminal, the moisture preventing unit may be disposed at the hole 102' of the rear case 102. Alternatively, the moisture preventing unit may be formed at the gas sensor 301, or may be formed at the gas hole 302 when the shielding protrusions, etc. are designed.

The gas sensor module of the present invention should include a semiconductor gas sensor, and the semiconductor gas sensor should be continuously provided with power in order to heat a heater. Hereinafter, will be explained a method for driving a semiconductor gas sensor to solve such a disadvantage.

Figure 6A:
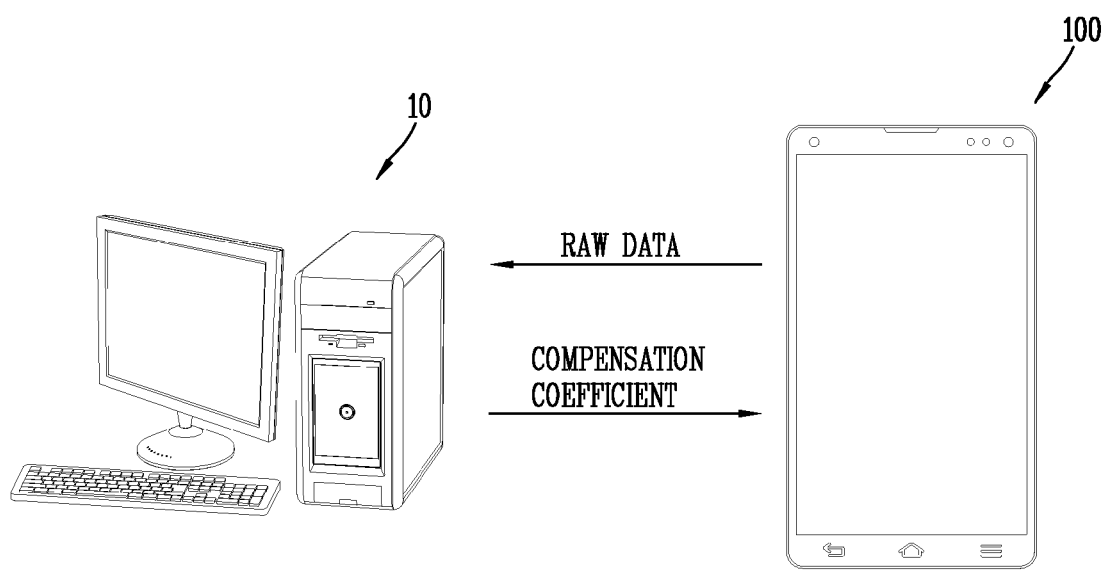
FIGS. 6A and 6B are conceptual views for explaining a driving method of a semiconductor gas sensor.
Figure 6B:
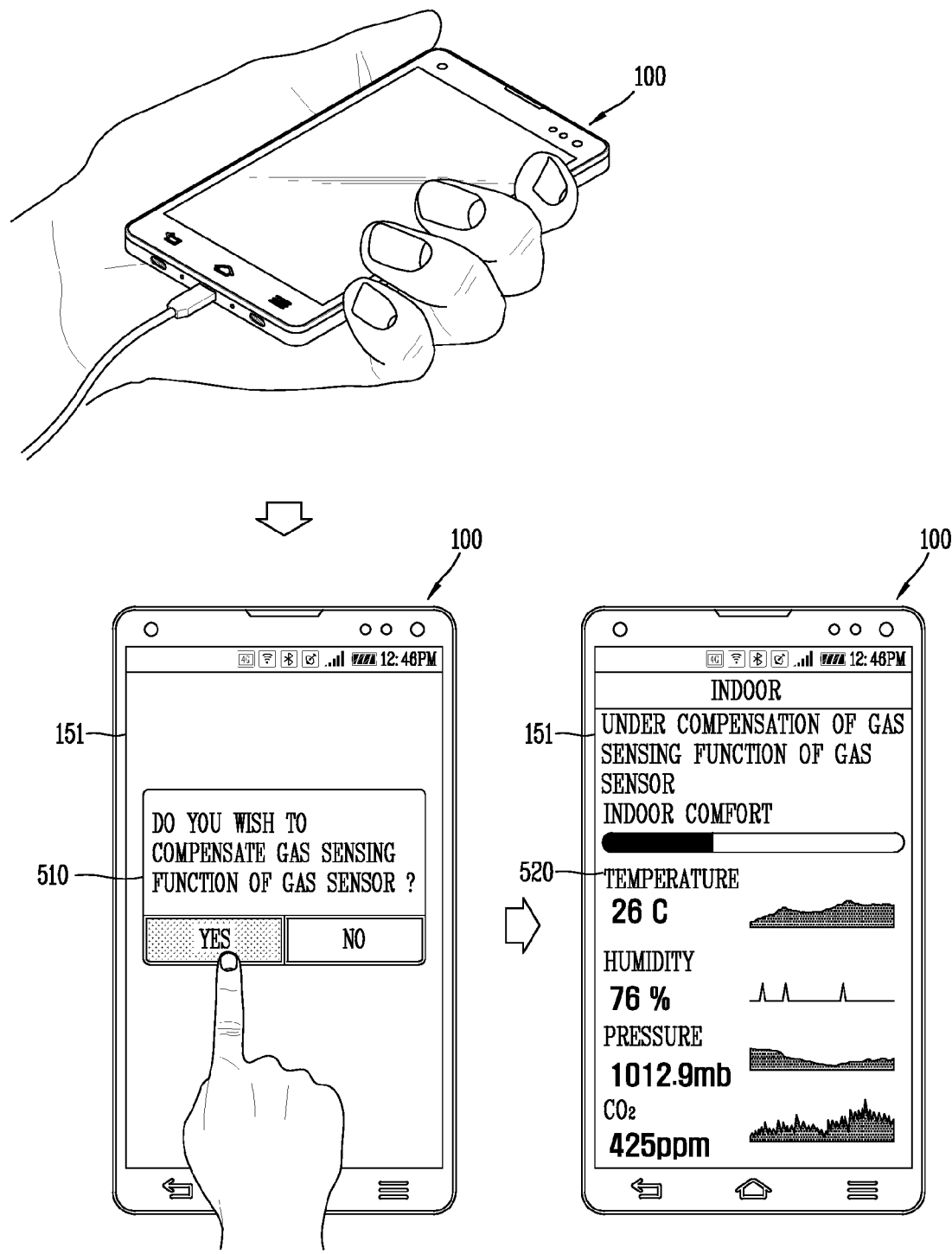

FIGS. 6A and 6B are conceptual views which explain a method for driving a semiconductor gas sensor.

The gas sensor included in the sensor module according to the present invention may be implemented as a semiconductor gas sensor. The semiconductor gas sensor is configured to sense gas by detecting a change of an electric conductivity when gas is absorbed to or detached from a sensing material (a chemical material) applied onto a film as the sensing material is activated by heating of a heater. In this case, the heater is operated by power of the battery.

For activation of the sensing material, the heater should be heated for a sufficient time. If the heater is turned on/off for a short time, the sensing material is not activated and reactivity becomes gradually lower. Further, if the semiconductor gas sensor is operated for a long time, a sensing function thereof may be lowered to have its lifespan terminated.

The controller 180 transmits raw data sensed by the gas sensor module 300 to a specific server 10. The specific server 10 may be an external device connected to the mobile terminal 100. The controller 180 transmits sensing data measured at a preset time period (e.g., once per day) to the server 10.

The server 10 (or an external device) extracts a change pattern of the sensing data. The server 10 may calculate a compensation coefficient based on the change pattern of the sensing data. The controller 180 of the mobile terminal 100 receives the compensation coefficient at preset time periods, and calculates compensation data by applying the compensation coefficient to the sensing data.

Since the compensation coefficient is changed according to quality (lifespan) of the gas sensor 301, compensation data which reflects quality (lifespan) of the gas sensor 301 may be provided. This may allow a user to be provided with more precise data without frequently replacing the gas sensor.

Referring to FIG. 6B, will be explained a method for executing a baking function periodically.

The controller 180 may execute a baking function for driving the heater for a specific time (several hours) at a preset time period (e.g., one month). The baking function corresponds to a burn-in step of driving the heater for a specific time (about 24~48 hours) at an initial usage stage in order to stably drive the gas sensor. Once the baking function is executed, gas particles attached to a sensing material of the gas sensor are detached from the sensing material.

The controller 180 may execute the baking function when the mobile terminal 100 is less used. For instance, the controller 180 may control the display unit 151 to output a pop-up window 510 inquiring whether to execute the baking function at a bedtime. Alternatively, the baking function may be automatically executed at a specific time set by a user.

The controller 180 may determine whether to execute the baking function at a specific time, based on a remaining amount of the battery. If the remaining amount of the battery is more than a reference value, the controller 180 executes the baking function. The reference value is determined according to whether the remaining amount of the battery exists when the baking function is terminated.

As shown in FIG. 6B, the baking function may be executed while the mobile terminal 100 is being charged. That is, if a charging device is connected to the mobile terminal 100 in a wired or wireless manner, the baking function is executed.

In this case, the controller 180 controls the display unit to output a pop-up window 510 inquiring whether to execute the baking function. Once the baking function is executed, the controller 180 controls the display unit 151 to display screen information 520 indicating that the gas sensor is being compensated. The screen information 520 may include at least one data being sensed by the gas sensor.

In this embodiment, as a user executes the baking function when power consumption of the mobile terminal 100 is low according to a usage frequency of the mobile terminal 100, a gas sensing efficiency may be enhanced while the user uses the mobile terminal 100.

Figure 7A:
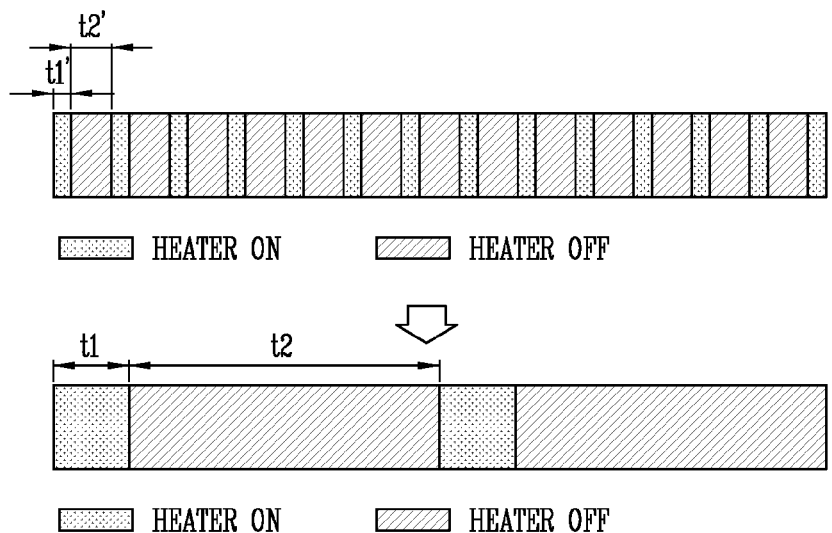
FIGS. 7A and 7B are conceptual views for explaining a driving method of a heater included in a gas sensor.
Figure 7B:
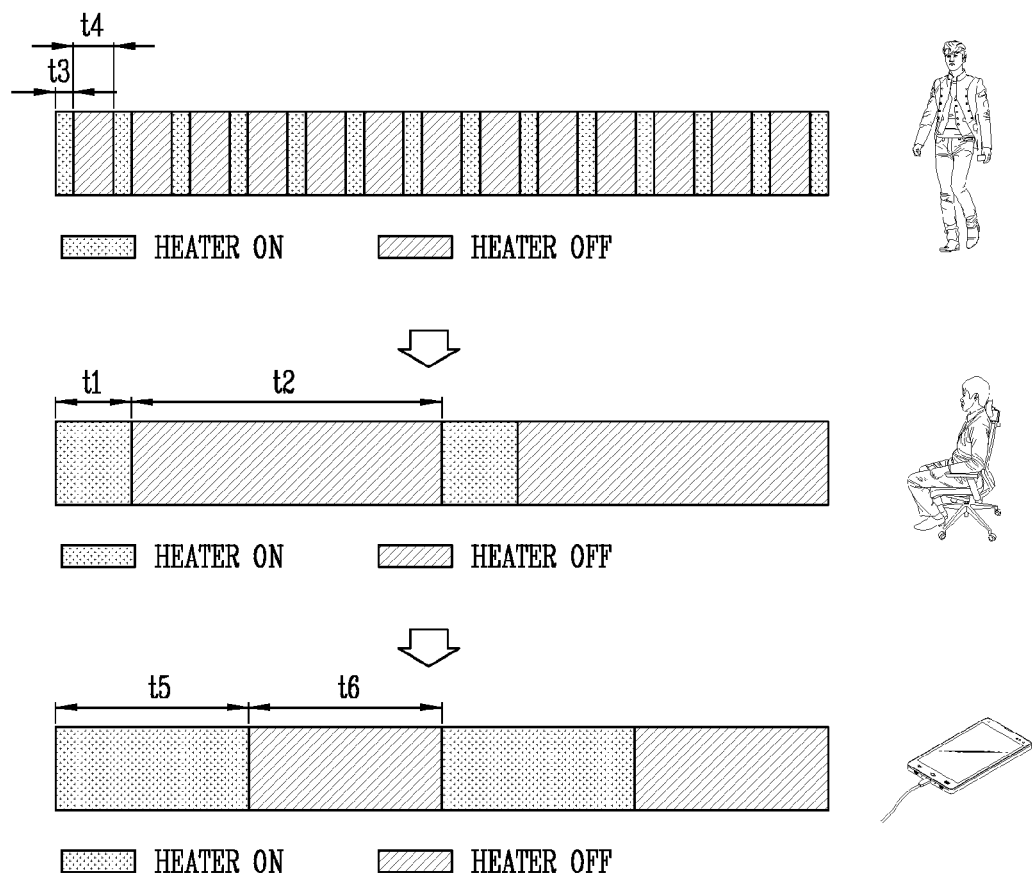

FIGS. 7A and 7B are conceptual views for explaining a driving method of the heater included in the gas sensor.

Referring to FIG. 7A, in a case where the gas sensor is mounted to the mobile terminal 100, the controller 180 controls an on/off period of the heater to be increased. That is, the controller controls the gas sensor to turn on the heater for a first time (t1), and to turn off the heater for a second time (t2) longer than the first time (t1).

In this case, power consumption of the mobile terminal may be the same as that in a case where a period to turn on/off the heater is short, and lowering of a gas sensing function may be prevented.

Referring to FIG. 7B, will be explained a method of controlling an on/off period of the heater. The mobile terminal 100 according to this embodiment may further include a sensing unit configured to sense a movement of the terminal body. The sensing unit may be implemented as an acceleration sensor, a gyro sensor, etc.

If a movement of the mobile terminal 100 (and a user who is holding the mobile terminal 100) is sensed by the sensing unit, the controller 180 controls the heater to be turned on for a third time (t3), and to be turn off for a fourth time (t4). The third and fourth times (t3, t4) are set to be shorter than the first and second times (t1, t2).

If it is determined by the sensing unit that the movement of the mobile terminal 100 is decreased, the controller 180 controls the heater to be turned on for the first time (t1) and to be turned off for the second time (t2).

That is, if a peripheral situation of the mobile terminal 100 is rapidly changed, the controller 180 turns on/off the heater at a high speed to enhance a gas sensing function.

If it is sensed that the mobile terminal 100 is being charged, the controller 180 turns on the heater for a fifth time (t5), and turns off the heater for a sixth time (t6). The fifth and sixth times (t5, t6) are set to be longer than the first and second times (t1, t2). As a time duration for which the heater is turned on is increased, a gas sensing function may be enhanced.

In this embodiment, since an on/off state of the heater for controlling a gas sensing function is controlled according to a movement and a usage state of the mobile terminal 100, power consumption may be minimized and a gas sensing efficiency may be enhanced.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a terminal body comprising a case that is shaped to define a first hole; and
a gas sensor module located adjacent to an interior side of the case, wherein the gas sensor module includes:
a gas sensor configured to sense a specific gas from air; and
an accommodation cap having an accommodation area shaped to accommodate the gas sensor and further shaped to define a second hole positioned relative to the first hole to permit introduction of the air entering at the first hole to be received by the gas sensor,
wherein an interior portion of the accommodation cap comprises a first side facing the first hole, wherein the first side is inclined at an acute angle relative to the first hole to facilitate the air to be received by the gas sensor,
wherein the gas sensor is located at a lower area of the accommodation area, and the gas sensor further includes an inlet formed to permit the air to be received by the gas sensor, and
wherein the accommodation cap further includes a second side and a third side, each being inclined at an angle that is sloped downward toward the bottom side.

2. The mobile terminal of claim 1, wherein the accommodation area further includes a bottom side and a top side that extends from a top edge of the inclined side toward the second hole,
wherein the inclined side does not extend over the inlet of the gas sensor, and
wherein a width of the bottom side is longer than a width of the top side.

3. The mobile terminal of claim 1, wherein the terminal body includes an inner frame configured to support electronic components, and a rear cover formed to cover one side of the inner frame, and
wherein the accommodation area is located between the rear cover and the inner frame.

4. The mobile terminal of claim 3, wherein the gas sensor module is formed to be detachable from the accommodation area to permit attachment of another gas sensor module having a gas sensor for sensing another type of gas.

5. The mobile terminal of claim 1, wherein the gas sensor module includes the gas sensor and another gas sensor.

6. The mobile terminal of claim 5, wherein the gas sensor is utilized for a lifespan, and the another gas sensor is utilized after the lifespan.

7. The mobile terminal of claim 1, wherein the accommodation cap includes one or more shielding protrusions protruding from an external surface of the accommodation cap, and
wherein each of the one or more shielding protrusions is received in a corresponding region of the case to prevent leakage of the air.

8. The mobile terminal of claim 1, wherein size of an interior side of the first hole is about the same as a size of an inner side of the second hole, and wherein a size of an outer side of the second hole, which is adjacent to the interior side of the first hole, is greater than the size of the interior side of the first hole.

9. The mobile terminal of claim 1, wherein the terminal body is further shaped to define a plurality of holes to permit the air to enter and be received by the gas sensor.

10. The mobile terminal of claim 1, wherein the terminal body further includes:
a plurality of electronic components located in the terminal body, wherein the terminal body is further shaped to define a plurality of holes that each correspond to one of the plurality of electronic components, wherein the first hole is one of the plurality of holes.

11. The mobile terminal of claim 10, wherein the second gas hole is between one of the plurality of electronic components and one of the plurality of holes, and
wherein the mobile terminal further includes a guide unit cooperating with the accommodation area, the guide unit configured to guide air to a second hole among the plurality of holes from an inner region of the one of the plurality of holes.

12. The mobile terminal of claim 1, wherein the first hole is configured to either output audio from an audio output unit, receive a voice input to provide to a microphone, or to permit insertion of an external interface device.

13. The mobile terminal of claim 1, wherein the gas sensor further includes an inlet formed on one surface and is configured to introduce the air to the gas sensor, and
wherein a moisture preventing unit is formed at one or more of the first hole, the second hole, or the inlet.

14. The mobile terminal of claim 1, wherein the terminal body includes a first body and a second body which are formed to be separated from each other,
wherein the second body is connected to a power supply configured to supply power to the mobile terminal,
wherein the first body is shaped to receive the power supply, and
wherein the gas sensor module is located at the second body.

15. The mobile terminal of claim 1, further comprising a rear cover formed to be separable from the terminal body, and
wherein the gas sensor module is located at a region formed by an inner frame of the terminal body and the rear cover.

16. The mobile terminal of claim 1, wherein the gas sensor includes a heater and is formed with a sensing material, and
wherein the mobile terminal further includes a controller configured to turn on the heater by supplying power to the gas sensor.

17. The mobile terminal of claim 16, wherein the terminal body further includes a power supply configured to supply power to the mobile terminal and to supply power to the gas sensor, and
wherein while the power supply is being charged, the controller turns on the heater such that gas particles attached to the sensing material are removed.

18. The mobile terminal of claim 16, further comprising a sensing unit configured to sense relative movement of the terminal body, and
wherein the controller turns on or off the heater based on the sensed movement of the terminal body.

* * * * *